US009833011B2

(12) United States Patent
Irie et al.

(10) Patent No.: US 9,833,011 B2
(45) Date of Patent: Dec. 5, 2017

(54) METHOD FOR MANUFACTURING FRESH PASTA

(71) Applicant: NISSHIN FOODS INC., Chiyoda-ku (JP)

(72) Inventors: Kentarou Irie, Fujimino (JP); Youhei Suga, Fujimino (JP); Norio Koizumi, Fujimino (JP); Takenori Watanabe, Fujimino (JP); Tsuguhiko Yoshida, Chiyoda-ku (JP)

(73) Assignee: NISSHIN FOODS INC., Chiyoda-ku (JP)

( * ) Notice: Subject to any disclaimer, the term of this patent is extended or adjusted under 35 U.S.C. 154(b) by 0 days.

(21) Appl. No.: 14/388,453

(22) PCT Filed: Mar. 1, 2013

(86) PCT No.: PCT/JP2013/055722
§ 371 (c)(1),
(2) Date: Sep. 26, 2014

(87) PCT Pub. No.: WO2013/157309
PCT Pub. Date: Oct. 24, 2013

(65) Prior Publication Data
US 2015/0313263 A1    Nov. 5, 2015

(30) Foreign Application Priority Data

Apr. 19, 2012 (JP) .................................. 2012-095719
May 31, 2012 (CN) .......................... 2012 1 0175036

(51) Int. Cl.
| *A23L 1/16* | (2006.01) |
| *A21D 13/40* | (2017.01) |
| *A21D 13/04* | (2017.01) |
| *A23P 30/20* | (2016.01) |
| *A23L 7/109* | (2016.01) |
| *A21D 15/00* | (2006.01) |
| *A21D 15/02* | (2006.01) |

(52) U.S. Cl.
CPC .............. *A23L 1/16* (2013.01); *A21D 13/04* (2013.01); *A21D 13/40* (2017.01); *A23L 7/109* (2016.08); *A23P 30/20* (2016.08); *A21D 15/00* (2013.01); *A21D 15/02* (2013.01); *A23V 2002/00* (2013.01)

(58) Field of Classification Search
CPC .......... A23L 1/16; A23L 1/1613; A23L 7/109; A21D 2/08; A21D 2/34; A21D 15/02; A23P 1/12; A23P 30/20; A23D 13/04; A23V 2002/00
USPC ....... 426/549, 557, 558, 560, 502, 503, 504, 426/516, 517, 496, 497
See application file for complete search history.

(56) References Cited

U.S. PATENT DOCUMENTS

| 4,414,235 A * | 11/1983 | Takekoshi ............... A23L 1/16 426/302 |
| 4,540,590 A * | 9/1985 | Harada ................ A23L 1/1613 426/324 |
| 4,965,082 A * | 10/1990 | Chawan ............... A23L 1/1613 426/331 |
| 5,139,808 A | 8/1992 | Barnes et al. |
| 2001/0000328 A1 | 4/2001 | Panattoni et al. |
| 2005/0196507 A1* | 9/2005 | Gimelli .................. A23L 7/109 426/557 |
| 2005/0281919 A1* | 12/2005 | Ueno .................... A23L 1/0067 426/100 |
| 2009/0252844 A1* | 10/2009 | Skinner .................... A23L 1/16 426/285 |
| 2010/0189862 A1 | 7/2010 | Massi |
| 2011/0088563 A1 | 4/2011 | Fedeli |
| 2011/0151091 A1* | 6/2011 | Ntiamoah ................ A01H 5/10 426/549 |
| 2014/0322421 A1 | 10/2014 | Irie et al. |
| 2014/0363557 A1* | 12/2014 | Irie .......................... A23L 1/16 426/509 |

FOREIGN PATENT DOCUMENTS

| CN | 1325638 | 12/2001 |
| CN | 101873802 | 10/2010 |
| CN | 102014707 | 4/2011 |
| EP | 2 774 491 | 9/2014 |
| EP | 2 796 057 | 10/2014 |
| JP | 10-295299 | 11/1998 |
| JP | 11-28066 | 2/1999 |
| JP | 11-243888 | 9/1999 |
| JP | 2000-262235 | 9/2000 |
| JP | 2001-245617 | 9/2001 |

(Continued)

OTHER PUBLICATIONS

Vita Spelt NPL, published Sep. 27, 2011, http://web.archive.org/web/20110927053748/http://www.natureslegacyforlife.com/faqs/what-is-spelt/.*
U.S. Appl. No. 14/364,581, filed Jun. 11, 2014, Irie, et al.
International Search Report dated May 28, 2013, in PCT/JP2013/055722, filed Mar. 1, 2013.
Written Opinion of the International Searching Authority dated May 28, 2013, in PCT/JP2013/055722, filed Mar. 1, 2013.
European Search Report in corresponding European Patent Application No. 13777781.9, dated Feb. 16, 2016.

(Continued)

*Primary Examiner* — Erik Kashnikow
*Assistant Examiner* — Bryan Kim
(74) *Attorney, Agent, or Firm* — Oblon, McClelland, Maier & Neustadt, L.L.P.

(57) ABSTRACT

A fresh pasta capable of providing a cooked pasta having a smooth surface appearance and a hard and elastic texture comparable to boiled dry pasta. A method for manufacturing a fresh pasta comprising extruding, at a pressure of 80 kgf/cm$^2$ to 200 kgf/cm$^2$ to form noodles, a dough obtained by kneading a raw material flour comprising a wheat flour of hexaploid wheat group and having a gluten index of 45 to 100.

18 Claims, No Drawings

(56) References Cited

FOREIGN PATENT DOCUMENTS

| JP | 2002-199852 | 7/2002 |
|---|---|---|
| JP | 2004-229570 | 8/2004 |
| JP | 2008-295338 | 12/2008 |
| JP | 2011-62116 | 3/2011 |
| JP | 2011-67163 | 4/2011 |
| JP | 2011-139662 | 7/2011 |
| WO | WO 2013/171930 | 11/2013 |

OTHER PUBLICATIONS

Bryan, G.J., "A PCR-Based Method for the Detection of Hexaploid Bread Wheat Dulteration of Durum Wheat and Pasta", Journal of Cereal Science, vol. 28, Issue 2, Sep. 1998, pp. 135-145.

Boyal, R.K., "Wheat Based Extruded Products", Indian miller, Boller Flur Miller's Federation of India, New Delhi, In. vol. 19, No. 6, Jan. 1, 1989, XP008026027, ISSN: 0376-9887, pp. 54, 56, 59, 62 and 63.

Office Action in corresponding Chinese Application No. 201380020502.4, dated Feb. 14, 2016.

Office Action dated Feb. 6, 2017 in European Patent Application No. 13 777 781.9.

"Pflanzliche Lebensmittel-Getreide und Getreidearten" In:R. Ebermann, I. Elmadfa: "Lehrbuch Lebensmittelchemie und Ernahrung", Springer, Wien, Jan. 1, 2011, pp. 342-343.

Clara Fares, et al., "Effect of processing and cooking on phenolic acid profile and antioxidant capacity of durum wheat pasta enriched with debranning fractions of wheat" Food Chemistry, vol. 119, No. 3, XP026754878, Apr. 1, 2010, pp. 1023-1029.

Office Action as received in the European Patent Application No. 13777781.9 dated Jun. 13, 2017 w/English Translation.

Magdaléna Lack-Bartošová, et al., "Technological Quality of Triticum Aestivum L. Cultivated in Sustainable Farming Systems—Indirect Baking Quality", Research Journal of Agricultural Science, 44 (1), 2012, pp. 94-98.

Bořivoj Šarapatka (ed.), "3$^{rd}$ Scientific Conference", Nov. 14, 2011, pp. 1-116, XP0055379098, Retrieved from the Internet: URL:http://bioinstitut. cz/documents/sbornikabst rakt2011_web.pdf [retrieved on Jun. 7, 2017].

* cited by examiner

METHOD FOR MANUFACTURING FRESH PASTA

TECHNICAL FIELD

The present invention relates to a method for manufacturing fresh pasta capable of providing cooked pasta having a smooth surface appearance and a hard and elastic texture comparable to boiled dry pasta.

BACKGROUND ART

Dry pasta is the most generally distributed and consumed pasta. Dry pasta is manufactured by forming dough into desired shapes such as noodle strands, and then drying them. Pasta obtained by cooking dry pasta is a favorable food having a hard and elastic texture.

In contrast, fresh pasta is pasta which is manufactured without going through a drying step. Fresh pasta is a different food from dry pasta in terms of manufacturing steps as well as product appearance. Pasta obtained by cooking fresh pasta is a favorable food having the pleasant taste and aroma of wheat. Meanwhile, because pasta obtained by cooking fresh pasta is softer than pasta obtained by cooking dry pasta, it is not necessarily a satisfactory food for consumers who prefer a harder texture.

Further, because fresh pasta has poor storage stability due to a high water content, it has a problem that it cannot be cooked in advance of serving. Fresh pasta in a chilled or frozen state is commercially available. However, it is difficult to maintain a favorable appearance and texture of freshly produced fresh pasta because chilled- or frozen-stored fresh pasta is prone to quality deterioration during storage. Further, when pasta cooked from fresh pasta is chilled- or frozen-stored with sauce on top, quality is deteriorated. Namely, for example, the sauce penetrates into the pasta during storage, resulting in an exceedingly soft texture.

Wheat is a plant belonging to the genus *Triticum* of the family Poaceae. The genus *Triticum* includes diploids, tetraploids and hexaploids, each respectively having, in somatic cells, two, four or six genomes, each genome being composed of seven chromosomes. Among them, hexaploids are referred to as "hexaploid wheat group", which is most abundantly cultivated. Hexaploid wheat group include bread wheat (also referred to as "common wheat") (*T. aestivum* or *T. vulgare*), club wheat (*T. compactum*), spelt wheat (*T. spelta*) and the like. Meanwhile, "durum wheat" (also referred to as "macaroni wheat") (*T. durum*) is a tetraploid, and is genetically different from hexaploid wheat group in that the durum wheat has a fewer number of chromosomes. Further, in comparison with hexaploid wheat group, durum wheat has a higher protein content, contains gluten having different properties, and is harder. Unlike hexaploid wheat group, it is difficult to mill durum wheat due to its hardness. Normally, durum wheat is grinded and seized in such a way as not to destroy starch and protein tissues, and then collected as "semolina" (coarse grains of wheat endosperm) in the specially designed milling steps.

In the field of manufacture of pasta including fresh pasta, the aforementioned semolina of durum wheat is generally used as a main raw material. Dough manufactured from durum semolina is hard, and therefore is suitable for extrusion, which is a general manufacturing method of pasta. Further, durum semolina produces an elastic texture, and thus is particularly favorably used for the manufacture of pasta expected to have an elastic texture, such as spaghetti and macaroni. However, owing to a smaller global supply of durum wheat compared to hexaploid wheat group, there is a problem that durum wheat is prone to price hikes.

Meanwhile, a method for manufacturing fresh pasta using wheat flour other than durum wheat is known. For example, Patent Literature 1 describes a method for manufacturing fresh noodles, comprising extruding a mixture of wheat flour, activated gluten and/or egg white, and water under the condition of reduced pressure. However, similarly to the conventional products, the fresh pasta manufactured by this method has a soft texture.

Patent Literature 2 describes fresh pasta manufactured from wheat flour to which ethanol and calcined calcium are added, the fresh pasta having a similar texture to that of dry pasta. However, occasionally, the fresh pasta thus obtained has a peculiar unpleasant flavor derived from ethanol and calcined calcium added.

Patent Literature 3 describes a grain flour composition for noodles, comprising 10 to 40% by weight of durum wheat and 5 to 40% by weight of heat-treated wheat. However, it is required that this grain flour composition contain durum wheat flour. When the content of durum wheat in this composition is reduced, the texture of the fresh pasta manufactured is deteriorated.

CITATION LIST

Patent Literature

[Patent Literature 1] JP-A-2001-245617
[Patent Literature 2] JP-A-10-295299
[Patent Literature 3] JP-A-11-243888

SUMMARY OF INVENTION

Technical Problem

An object of the present invention is to provide a method for manufacturing fresh pasta which attains, when cooked with heat, a smooth surface appearance and an appropriately hard and elastic texture comparable to boiled dry pasta, and the above fresh pasta which is further capable of maintaining, even after being cooked with heat and then frozen-stored, the appearance and texture equivalent to those before freezing once it is thawed.

Solution to Problem

The present inventors conducted various studies in order to achieve the aforementioned object. As a result, the present inventors found a method for manufacturing fresh pasta comprising extruding, at a specific pressure to form noodles, dough prepared from raw material flour comprising hexaploid wheat group and having a particular gluten index value. The present inventors further found that when the fresh pasta manufactured by the above method is cooked with heat, it can provide cooked pasta having a smooth surface appearance and an appropriately hard and elastic texture comparable to boiled dry pasta, and that even after the above fresh pasta is cooked with heat and then frozen-stored, it still maintains a favorable appearance and a texture comparable to those before freezing once it is thawed, thereby completing the present invention.

That is, the present invention provides a method for manufacturing a fresh pasta comprising extruding, at a pressure of 80 kgf/cm$^2$ to 200 kgf/cm$^2$ to form noodles, a dough obtained by kneading a raw material flour comprising a wheat flour of hexaploid wheat group and having a gluten index of 45 to 100.

The present invention also provides a method for manufacturing a cooked and frozen pasta comprising: manufacturing a fresh pasta by extruding, at a pressure of 80 kgf/cm$^2$ to 200 kgf/cm$^2$ to form noodles, a dough obtained by kneading a raw material flour comprising a wheat flour of hexaploid wheat group and having a gluten index of 45 to 100; cooking the fresh pasta with heat; and freezing the cooked pasta.

Advantageous Effects of Invention

The fresh pasta obtained by the manufacturing method of the present invention provides cooked pasta having a smooth surface appearance and a hard and elastic texture comparable to boiled dry pasta, despite the fact that the fresh pasta does not contain durum wheat, which is normally used in the manufacture of pasta. Further, even when the above fresh pasta is cooked with heat and then frozen-stored, it does not undergo quality deterioration during frozen-storage, and can provide a favorable appearance and texture equivalent to those before freezing once it is thawed. Moreover, the above fresh pasta absorbs little water and oil during freezing as well as thawing. Accordingly, even when the above pasta is frozen-stored with sauce on top after being cooked with heat, the sauce dose not readily penetrate into the pasta, whereby quality deterioration during storage is prevented.

DESCRIPTION OF EMBODIMENTS

Conventionally, in the field of pasta manufacturing, fresh pasta is generally manufactured by rolling out dough while applying pressure and cutting out the resulting dough into noodles in accordance with various noodle manufacturing methods such as rolling, or by extruding dough while applying pressure to form noodles. However, according to the conventional methods for manufacturing fresh pasta, high pressure was not applied to dough during noodle manufacturing because there was no need to dry fresh noodles, or a soft and chewy and resilient (mochimochi) texture unique to fresh pasta had to be preserved. According to the conventional methods for manufacturing fresh pasta, pressure applied to dough was approximately 0 kgf/cm$^2$ in the case of rolling, and only about 20 kgf/cm$^2$ even in the case of extrusion.

However, according to the method for manufacturing the fresh pasta of the present invention, unusually high pressure is applied to dough to manufacture fresh pasta. For example, according to the method for manufacturing the fresh pasta of the present invention, dough can be extruded to form noodles at a pressure of 80 kgf/cm$^2$ to 200 kgf/cm$^2$. The extrusion pressure used in this method of the present invention is equal to or more than the extrusion pressure normally used in the dry pasta manufacturing (about 70 to 160 kgf/cm$^2$) and is extremely high for a pressure to be applied to fresh pasta.

Also, according to the method for manufacturing the fresh pasta of the present invention, the raw material flour of the dough of the aforementioned fresh pasta contains, as a main raw material, a wheat flour of hexaploid wheat group, not durum wheat which is generally used in the field of pasta manufacturing. In the present specification, hexaploid wheat group refers to, among plants belonging to the genus *Triticum* of the family Poaceae, those which are hexaploids. Examples of hexaploid wheat group include, but are not limited to, bread wheat (also referred to as "common wheat") (*T. aestivum* or *T. vulgare*), club wheat (*T. compactum*), spelt wheat (*T. spelta*) and the like. The hexaploid wheat group can be used alone or in combination of two or more of them.

The wheat flour of hexaploid wheat group used in the method of the present invention can be manufactured from the aforementioned hexaploid wheat group by usual grinding or flour milling step. Examples of the wheat flour of hexaploid wheat group include hard wheat flour, semi-hard wheat flour, moderate wheat flour and soft wheat flour. These wheat flours may be used alone or in combination of two or more of them.

Alternatively, it is preferable to further contain, in addition to the aforementioned wheat flour of hexaploid wheat group, an egg white powder in the raw material flour of the dough of the aforementioned fresh pasta so that the hard and elastic texture of the resulting pasta can be further improved. The content of the egg white powder in the raw material flour is preferably 0.3 to 5 parts by mass, more preferably 1 to 3 parts by mass relative to 100 parts by mass of the wheat flour of hexaploid wheat group. Further, the aforementioned raw material flour can contain, in addition to the aforementioned the wheat flour of the hexaploid wheat group and egg white powder, other raw materials which are normally used in the manufacture of fresh pasta, such as starch, sugars, a whole egg powder, an egg yolk powder, salt, oil and fat, an emulsifier and a thickener. The content of these other raw materials can be 10 parts by mass or less, preferably 5 parts by mass or less in 100 parts by mass of the raw material flour.

Further, the gluten index of the aforementioned raw material flour is 45 to 100, preferably 60 to 100, more preferably 76 to 100. The gluten index of the above raw material flour of less than 45 is not preferable because the resulting fresh pasta has a rough surface and a soft texture.

The raw material flour having the particular gluten index described above can be prepared by, for example, using the aforementioned wheat flour of hexaploid wheat group having that particular gluten index as the raw material. Alternatively, the raw material flour having that particular gluten index can be prepared by adjusting, in a mixed flour obtained by mixing the aforementioned wheat flour of hexaploid wheat group and other raw materials, the content and gluten index of the above wheat flour of hexaploid wheat group so as to bring the gluten index of the above mixed flour to the particular value described above.

Preferable examples of the wheat flour of hexaploid wheat group which serves as the main raw material flour used in the method of the present invention include Australian Standard White (ASW), Hokushin wheat (Ministry of Agriculture, Forestry and Fisheries of Japan, Variety Registration No. 4949) and the like. Alternatively, preferable examples also include a wheat flour of hexaploid wheat group adjusted to have the particular gluten index described above or a gluten index close to that particular value by mixing wheat flours of hexaploid wheat group having different gluten indices.

In the present specification, a gluten index of the raw material flour or wheat flour refers to a value measured in accordance with the method approved by American Association of Cereal Chemists (American Association of Cereal Chemists: Approved Methods of the AACC, 10th ed., Methods 38-12, The Association, 2000). A specific measurement method will be described below.

<Measurement of Gluten Index>

To 10 g of the raw material flour or wheat flour, a 2% aqueous solution of sodium chloride is added to prepare dough. Subsequently, the dough is washed with a 2% aqueous solution of sodium chloride to obtain wet gluten. The wet gluten is then dehydrated by high-speed centrifugation for one minute at 6000 revolutions on a special sieve. Then, from the gluten remaining on the sieve and the gluten passing through the sieve, a gluten index is calculated by the following formula.

$$\text{Gluten index} = \frac{\text{Amount of gluten remaining on the sieve}}{\text{Amount of gluten remaining on the sieve} + \text{Amount of gluten passing through the sieve}} \times 100$$

The dough for fresh pasta used in the method for manufacturing the fresh pasta of the present invention can be prepared by adding kneading water to the aforementioned raw material flour, and then kneading the resulting mixture. As the kneading water used for manufacturing dough, any type of water used for usual noodle manufacturing such as water, saline and lye water can be used. Considering that the resulting dough is subjected to such a high extrusion pressure as described above, the amount of kneading water added is preferably 15 to 35 parts by mass, more preferably 20 to 30 parts by mass, even more preferably 24 to 27 parts by mass relative to 100 parts by mass of raw material flour. When the amount of kneading water added is less than 15 parts by mass, the fresh pasta manufactured has a rough surface, to thereby become fragile. On the other hand, when the amount of kneading water added is more than 35 parts by mass, the dough becomes weak and prone to damage, and thus the desired appearance and texture cannot be imparted to the fresh pasta thus manufactured.

According to the manufacturing method of the present invention, fresh pasta is manufactured by making noodles from the dough described above under high pressure. That is, according to the manufacturing method of the present invention, fresh pasta can be manufactured by extruding the dough at a pressure of, for example, 80 kgf/cm$^2$ to 200 kgf/cm$^2$, preferably 120 to 160 kgf/cm$^2$ to form noodles. The degree of pressure reduction during noodle extrusion may be −200 mmHg to under vacuum, preferably −600 mmHg to under vacuum. Noodle extrusion can be carried out by using, for example, an extrusion noodle making machine normally used for the manufacture of dry pasta.

The fresh pasta manufactured by the method of the present invention can encompass fresh pasta in any form such as long pasta, short pasta and flat pasta. A method of forming fresh pasta is not particularly limited. For example, after extruding noodle dough into noodle sheets, they can be formed in desired shapes such as noodle strands by, for example, rolling and cutting in accordance with a routine method. Alternatively, pasta can be formed into desired shapes by extruding noodle dough through dies having openings of appropriate shape.

The fresh pasta manufactured by the aforementioned method of the present invention can be cooked with heat directly, without passing through a drying step, or after being stored under publicly known storage conditions for fresh pasta. The procedure for cooking the above fresh pasta with heat is not particularly limited. For example, when it is boiled, a usual method of boiling fresh pasta can be adopted. As a more specific example, boiling for 2 to 8 minutes in boiling water can be adopted. The pasta thus cooked with heat can be subjected to draining of hot water, cooling, seasoning and so on, as needed, in accordance with a usual method of cooking pasta.

Despite the fact that the cooked pasta obtained from the fresh pasta manufactured by the aforementioned method of the present invention does not contain durum wheat which is normally used for the manufacture of pasta, it has a non-rough and smooth surface appearance. Also, despite the fact that the above fresh pasta does not contain durum wheat, and moreover, is not dried, it can provide cooked pasta having a hard and elastic texture comparable to boiled dry pasta.

Alternatively, the fresh pasta manufactured by the method for manufacturing the fresh pasta of the present invention can be frozen-stored after it has been cooked with heat. The cooked and frozen pasta obtained from the aforementioned fresh pasta has improved resistance to freezing compared to conventional fresh pasta or frozen products of boiled fresh pasta, and therefore, the smooth surface appearance comparable to that obtained right after cooking with heat and a hard and elastic texture comparable to boiled dry pasta can be provided even when it is thawed or re-heated after being frozen-stored.

Accordingly, the present invention also provides a method for manufacturing a cooked and frozen pasta comprising: manufacturing a fresh pasta by extruding, at a pressure of 80 kgf/cm$^2$ to 200 kgf/cm$^2$ to form noodles, a dough obtained by kneading a raw material flour comprising a wheat flour of hexaploid wheat group and having a gluten index of 45 to 100; cooking the fresh pasta with heat; and freezing the cooked pasta.

In the aforementioned method for manufacturing the cooked and frozen pasta of the present invention, the procedures of the steps of manufacturing fresh pasta and cooking the fresh pasta with heat are as described above. As the procedure of the step of freezing the cooked pasta, freezing process normally performed on noodles can be adopted. For example, the aforementioned cooked pasta can be subjected to freezing process after being subjected to draining of hot water or cooling, as needed. If desired, the pasta can be divided into certain portions, for example, 150 to 300 g for one person, and served on trays and the like, and then subjected to freezing process. For the freezing process, any method such as quick freezing and slow freezing can be adopted; however, quick freezing is preferable. The cooked and frozen pasta manufactured by the above procedure can be stored under normal frozen-storage conditions.

Alternatively, in the aforementioned freezing step, the cooked pasta can be frozen with sauce. For example, the pasta cooked as described above can be frozen with sauce on top after it is divided into trays and the like, or the cooked pasta may be mixed with sauce, served on trays and then frozen. As the sauce, any regular pasta sauce may be used, and examples thereof include, but are not limited to, a tomato-based sauce such as meat sauce, Neapolitan sauce and arrabbiata sauce, a white sauce such as carbonara sauce, and a brown sauce.

The cooked and frozen pasta manufactured in accordance with the aforementioned method of the present invention absorbs little water and oil during freezing as well as thawing and maintains a smooth surface even while it is frozen-stored, and moreover, even when it is frozen-stored with sauce, excessive penetration of sauce into the pasta does not occur. Accordingly, in the above cooked and frozen pasta, deterioration of the quality of texture or appearance during frozen-storage is prevented.

EXAMPLES

Hereinbelow, the present invention will be further described in detail with reference to Examples. However, the present invention is not limited only to these Examples.

Production Examples 1 to 8

A wheat flour having a gluten index of 76 was prepared by blending Hokushin wheat flour and ASW wheat flour (both are hexaploid wheat group). The resulting wheat flour was used as the raw material flour. A dough was prepared by mixing 26 parts by mass of water relative to 100 parts by mass of the raw material flour, followed by kneading. Under a reduced pressure condition of −600 mmHg, the dough was extruded to form noodles by a pasta making machine under each of the following pressure conditions of 30, 70, 80, 120, 160, 200, 210 and 250 kgf/cm², whereby eight kinds of fresh spaghettis (1.8 mm in diameter) were obtained (Production Examples 1 to 8).

Test Example 1

The fresh spaghettis of Production Examples 1 to 8 were boiled in hot water for five minutes and then cooled with water, whereby boiled spaghettis were produced. The boiled spaghettis were divided into three trays (160 mm×120 mm; made of polypropylene) at 180 g per tray. Separately, commercially available dried spaghetti made from durum semolina (the product of Nisshin Foods, Inc.) was boiled at a yield of 230% and then cooled with water, and then divided into three trays (160 mm×120 mm; made of polypropylene) at 180 g per tray (Reference Example).

The boiled spaghetti (right after boiling) in the first tray was immediately evaluated for appearance and texture.

The boiled spaghetti in the second tray was directly frozen quickly at −35° C. (without sauce). The boiled spaghetti in the third tray was quickly frozen at −35° C. after 100 g of commercially available canned meat sauce (the product of Nisshin Foods, Inc.) had been placed on top of the lump of noodles (with sauce). These boiled and frozen spaghettis were removed from the trays and packed in polypropylene bags, and then stored at −18° C. After one week, the boiled and frozen spaghettis were removed from the bags and then thawed by heating in a microwave oven (600 W). Spaghettis without sauce were heated for three minutes, whereas spaghettis with sauce were heated for 4.5 minutes. The appearance and texture of the spaghetti after thawing were evaluated. The spaghettis with sauce were lightly mixed after heating and the appearance and texture of the spaghettis with sauce were evaluated. Evaluation was conducted by 10 panelists based on the evaluation criteria shown in Table 1, and average scores were obtained. The results are shown in Table 2.

TABLE 1

| | | |
|---|---|---|
| Appearance of spaghetti (right after boiling or after thawing) | 5 | Noodle surface has a very smooth appearance. |
| | 4 | Noodle surface has a fairly smooth appearance. |
| | 3 | Noodle surface is relatively smooth without roughness. |
| | 2 | Noodle surface is slightly coarse or melted. |
| | 1 | Noodle surface is coarse or melted. |
| Texture of spaghetti (right after boiling or after thawing) | 5 | Excellent texture with sufficient hardness and elasticity comparable to boiled dry pasta. |
| | 4 | Favorable texture with hardness and elasticity comparable to boiled dry pasta. |
| | 3 | Relatively hard and elastic, acceptable texture. |
| | 2 | Slightly too soft or hard, lacking a hard and elastic texture comparable to boiled dry pasta. |
| | 1 | Too soft or hard, devoid of a hard and elastic texture comparable to boiled dry pasta. |
| Appearance of spaghetti with sauce after thawing | 5 | Sauce excellently and evenly clings to noodles. |
| | 4 | Sauce clings to noodles well. |
| | 3 | Sauce moderately clings to noodles. |
| | 2 | Sauce poorly or unevenly clings to noodles. |
| | 1 | Sauce very poorly and unevenly clings to noodles. |
| Texture of spaghetti with sauce after thawing | 5 | Sufficiently hard and elastic as boiled dry spaghetti, excellent texture with good harmony with the sauce. |
| | 4 | Hard and elastic as boiled dry spaghetti, favorable texture with harmony with the sauce. |
| | 3 | Relatively hard and elastic, acceptable texture. |
| | 2 | Slightly too soft or hard, somewhat poor texture with noodles absorbing a small amount of sauce. |
| | 1 | Too soft or hard, poor texture with noodles absorbing a large amount of sauce. |

TABLE 2

| | Production Example 1 | Production Example 2 | Production Example 3 | Production Example 4 | Production Example 5 | Production Example 6 | Production Example 7 | Production Example 8 | Reference Example |
|---|---|---|---|---|---|---|---|---|---|
| Extrusion pressure (kgf/cm²) | 30 | 70 | 80 | 120 | 160 | 200 | 210 | 250 | — |
| Appearance of spaghetti (right after boiling) | 1.6 | 2.7 | 3.9 | 4.8 | 4.7 | 4.5 | 4.0 | 3.8 | 4.9 |
| Texture of spaghetti (right after boiling) | 2.2 | 3.1 | 3.7 | 4.8 | 4.6 | 4.0 | 3.1 | 2.5 | 4.9 |
| Appearance of spaghetti (after thawing) | 1.5 | 2.4 | 3.7 | 4.8 | 4.6 | 4.5 | 3.7 | 3.5 | 4.8 |

TABLE 2-continued

|  | Production Example 1 | Production Example 2 | Production Example 3 | Production Example 4 | Production Example 5 | Production Example 6 | Production Example 7 | Production Example 8 | Reference Example |
|---|---|---|---|---|---|---|---|---|---|
| Texture of spaghetti (after thawing) | 2.1 | 3.0 | 3.7 | 4.7 | 4.6 | 4.0 | 3.1 | 2.1 | 4.8 |
| Appearance of spaghetti with sauce after thawing | 2.3 | 2.8 | 4.0 | 4.5 | 4.4 | 4.0 | 3.2 | 2.5 | 4.7 |
| Texture of spaghetti with sauce after thawing | 1.8 | 2.6 | 3.7 | 4.1 | 4.0 | 3.2 | 2.5 | 1.9 | 4.8 |

Test Example 2

The following wheat flours were prepared: a wheat flour having a gluten index of 40 and obtained by blending Norin No. 61 (hexaploid wheat group) and starch; a wheat flour having a gluten index of 45 and obtained by blending Norin No. 61 and soft wheat flour, Oumu (the product of Nisshin Flour Milling, Inc.) (both are hexaploid wheat group); a wheat flour having a gluten index of 60 and obtained by blending Hokushin wheat flour and soft wheat flour, Oumu (the product of Nisshin Flour Milling, Inc.) (both are hexaploid wheat group); a wheat flour having a gluten index of 86 and obtained by blending hard wheat flour, Toku number one (the product of Nisshin Flour Milling, Inc.) and ASW wheat flour (both are hexaploid wheat group); and a wheat flour having a gluten index of 98, obtained by blending hard wheat flour, Million (the product of Nisshin Flour Milling, Inc.) and hard wheat flour, Toku No. 1 (the product of Nisshin Flour Milling, Inc.) (both are hexaploid wheat group). Except for using each of the above wheat flours as the raw material flour, fresh spaghettis (Production Examples 9 to 13) were each manufactured by the same procedure as in Production Example 5 (noodle extrusion pressure: 160 kgf/cm²). From each of the obtained fresh spaghettis of Production Examples 9 to 13, freshly boiled spaghetti and boiled spaghetti which was frozen-stored and then thawed (with and without sauce) were produced by the same procedure as in Test Example 1, and evaluated for appearance and texture by the same procedure as in Test Example 1.

The results are shown in Table 3. Also, the results of Production Example 5 are shown again in Table 3.

TABLE 3

|  | Production Example 9 | Production Example 10 | Production Example 11 | Production Example 5 | Production Example 12 | Production Example 13 |
|---|---|---|---|---|---|---|
| Gluten index of raw material flour | 40 | 45 | 60 | 76 | 86 | 98 |
| Appearance of spaghetti (right after boiling) | 2.5 | 3.7 | 4.4 | 4.7 | 4.8 | 4.8 |
| Texture of spaghetti (right after boiling) | 3.1 | 3.5 | 4.2 | 4.6 | 4.4 | 4.1 |
| Appearance of spaghetti (after thawing) | 2.3 | 3.4 | 4.3 | 4.6 | 4.5 | 4.5 |
| Texture of spaghetti (after thawing) | 2.2 | 3.7 | 3.9 | 4.6 | 4.3 | 4.1 |
| Appearance of spaghetti with sauce after thawing | 2.4 | 3.6 | 3.9 | 4.4 | 4.3 | 4.1 |
| Texture of spaghetti with sauce after thawing | 1.9 | 3.7 | 3.9 | 4.0 | 4.0 | 3.9 |

Test Example 3

A wheat flour having a gluten index of 76 was prepared by blending Hokushin wheat flour and ASW wheat flour (both are hexaploid wheat group). The resulting wheat flour was used as the raw material flour. Except for adding, to 100 parts by mass of the raw material flour, water in amounts shown in Table 4, fresh spaghettis (Production Examples 14 to 21) were produced by the same procedure as in Production Example 5 (noodle extrusion pressure: 160 kgf/cm²). From each of the obtained fresh spaghettis of Production Examples 14 to 21, freshly boiled spaghetti and boiled spaghetti which was frozen-stored and then thawed (with and without sauce) were produced by the same procedure as in Test Example 1, and evaluated for appearance and texture by the same procedure as in Test Example 1.

The results are shown in Table 4.

TABLE 4

|  | Production Example 14 | Production Example 15 | Production Example 16 | Production Example 17 | Production Example 18 | Production Example 19 | Production Example 20 | Production Example 21 |
| --- | --- | --- | --- | --- | --- | --- | --- | --- |
| Water (part by mass) | 13 | 15 | 20 | 24 | 27 | 30 | 35 | 37 |
| Appearance of spaghetti (right after boiling) | 2.1 | 3.6 | 4.2 | 4.7 | 4.6 | 4.2 | 3.5 | 3.0 |
| Texture of spaghetti (right after boiling) | 1.5 | 3.3 | 4.1 | 4.6 | 4.5 | 4.0 | 3.5 | 2.5 |
| Appearance of spaghetti (after thawing) | 1.3 | 3.4 | 4.0 | 4.6 | 4.5 | 4.6 | 3.4 | 2.9 |
| Texture of spaghetti (after thawing) | 1.2 | 3.5 | 3.9 | 4.6 | 4.6 | 4.1 | 3.7 | 2.3 |
| Appearance of spaghetti with sauce after thawing | 2.7 | 3.4 | 3.9 | 4.4 | 4.4 | 4.1 | 3.4 | 2.8 |
| Texture of spaghetti with sauce after thawing | 1.2 | 3.6 | 3.7 | 4.0 | 4.0 | 3.9 | 3.3 | 2.7 |

Test Example 4

A wheat flour having a gluten index of 76 was prepared by blending Hokushin wheat flour and ASW wheat flour (both are hexaploid wheat group). Except for using a flour containing, relative to 100 parts by mass of the above wheat flour, an egg white powder (dried egg white ELS: Kewpie Corporation) in amounts shown in Table 5 as the raw material flour, fresh spaghettis (Production Examples 22 to 27) were produced by the same procedure as in Production Example 19 (noodle extrusion pressure: 160 kgf/cm$^2$, 30 parts by mass of water relative to 100 parts by mass of raw material flour). From each of the obtained fresh spaghettis of Production Examples 22 to 27, freshly boiled spaghetti and boiled spaghetti which was frozen-stored and thawed (with and without sauce) were produced by the same procedure as in Test Example 1, and evaluated for appearance and texture by the same procedure as in Test Example 1.

The results are shown in Table 5. Also, the results of Production Example 19 are shown again in Table 5.

TABLE 5

|  | Production Example 19 | Production Example 22 | Production Example 23 | Production Example 24 | Production Example 25 | Production Example 26 | Production Example 27 |
| --- | --- | --- | --- | --- | --- | --- | --- |
| Dried egg white (part by mass) | 0 | 0.1 | 0.3 | 1 | 3 | 5 | 6 |
| Appearance of spaghetti (right after boiling) | 4.2 | 4.2 | 4.2 | 4.3 | 4.6 | 4.5 | 4.1 |
| Texture of spaghetti (right after boiling) | 4.0 | 4.0 | 4.4 | 4.7 | 4.8 | 4.5 | 4.0 |
| Appearance of spaghetti (after thawing) | 4.6 | 4.5 | 4.6 | 4.7 | 4.7 | 4.6 | 4.6 |
| Texture of spaghetti (after thawing) | 4.1 | 4.1 | 4.4 | 4.7 | 4.8 | 4.5 | 4.1 |
| Appearance of spaghetti with sauce after thawing | 4.1 | 4.0 | 4.1 | 4.4 | 4.5 | 4.2 | 4.1 |

TABLE 5-continued

| | Production Example 19 | Production Example 22 | Production Example 23 | Production Example 24 | Production Example 25 | Production Example 26 | Production Example 27 |
|---|---|---|---|---|---|---|---|
| Texture of spaghetti with sauce after thawing | 3.9 | 3.9 | 4.3 | 4.6 | 4.8 | 4.4 | 3.8 |

The invention claimed is:

1. A method for manufacturing a fresh pasta comprising extruding, at a pressure of 80 kgf/cm$^2$ to 200 kgf/cm$^2$ to form noodles, a dough obtained by kneading a raw material flour comprising a wheat flour of hexaploid wheat group and having a gluten index of 76 to 86.

2. The method according to claim 1, wherein the dough is obtained by kneading 100 parts by mass of the raw material flour and 15 to 35 parts by mass of kneading water.

3. The method according to claim 1, wherein the degree of pressure reduction during extrusion is −200 mmHg to vacuum.

4. The method according to claim 1, wherein the raw material flour further comprises 0.3 to 5 parts by mass of an egg white powder relative to 100 parts by mass of the wheat flour.

5. A method for manufacturing a cooked and frozen pasta comprising:
    manufacturing a fresh pasta by extruding, at a pressure of 80 kgf/cm$^2$ to 200 kg/cm$^2$ to form noodles, a dough obtained by kneading a raw material flour comprising a wheat flour of hexaploid wheat group and having a gluten index of 76 to 86;
    cooking the fresh pasta with heat; and
    freezing the cooked pasta.

6. The method according to claim 5, wherein the dough is obtained by kneading 100 parts by mass of the raw material flour and 15 to 35 parts by mass of kneading water.

7. The method according to claim 5, wherein the degree of pressure reduction during extrusion is −200 mmHg to vacuum.

8. The method according to claim 5, wherein the raw material flour comprises 0.3 to 5 parts by mass of an egg white powder relative to 100 parts by mass of the wheat flour.

9. The method according to claim 5, wherein the pasta thus cooked is frozen with a sauce.

10. The method according to claim 1, wherein the wheat flour of hexaploid wheat group is a hard wheat flour, semi-hard wheat flour, moderate wheat flour or soft wheat flour.

11. The method according to claim 1, wherein the dough is extruded at a pressure of 120 to 160 kgf/cm$^2$.

12. The method according to claim 1, wherein the raw material flour further comprises at least one member selected from the group consisting of starch, sugars, whole egg powder, egg yolk powder, salt, oil and fat, emulsifier and thickener.

13. The method according to claim 1, wherein the fresh pasta is long pasta, short pasta or flat pasta.

14. The method according to claim 5, wherein the wheat flour of hexaploid wheat group is a hard wheat flour, semi-hard wheat flour, moderate wheat flour or soft wheat flour.

15. The method according to claim 5, wherein the dough is extruded at a pressure of 120 to 160 kgf/cm$^2$.

16. The method according to claim 5, wherein the raw material flour further comprises at least one member selected from the group consisting of starch, sugars, whole egg powder, egg yolk powder, salt, oil and fat, emulsifier and thickener.

17. The method according to claim 5, wherein the fresh pasta is long pasta, short pasta or flat pasta.

18. A method for manufacturing a fresh pasta comprising extruding, at a pressure of 80 kgf/cm$^2$ to 200 kgf/cm$^2$ to form noodles, a dough comprising a wheat flour component,
    wherein the wheat flour component consists of a wheat flour of hexaploid wheat group and has a gluten index of 76 to 86.

* * * * *